United States Patent [19]
Kim

[11] Patent Number: 5,848,626
[45] Date of Patent: Dec. 15, 1998

[54] FUEL TANK FILLER PIPE ASSEMBLY FOR A VEHICLE

[75] Inventor: Jae-San Kim, Suwon, Rep. of Korea

[73] Assignee: Hyundai Motor Company, Ltd., Seoul, Rep. of Korea

[21] Appl. No.: 774,380

[22] Filed: Dec. 30, 1996

[30] Foreign Application Priority Data

Dec. 30, 1995 [KR] Rep. of Korea ............... 95-56340

[51] Int. Cl.$^6$ ............... B65B 1/04; B65B 3/04
[52] U.S. Cl. ............... 141/348; 141/301; 141/350; 220/86.2
[58] Field of Search ............... 141/59, 44–46, 141/291, 292, 294, 301, 302, 348–350; 220/86.2, 746, 749; 137/587, 588; 251/299, 303, 279; 123/518, 519

[56] References Cited

U.S. PATENT DOCUMENTS

| | | | |
|---|---|---|---|
| 1,766,069 | 6/1930 | Donley et al. | 251/303 |
| 3,386,467 | 6/1968 | Katchka | 251/303 |
| 4,809,863 | 3/1989 | Woodcock et al. | 220/86.2 |
| 4,809,865 | 3/1989 | Mori et al. | 220/86.2 |
| 4,941,587 | 7/1990 | Terada | 220/86.2 |
| 5,215,132 | 6/1993 | Kobayashi | 220/746 |
| 5,404,906 | 4/1995 | Aoshima et al. | 220/86.2 |

*Primary Examiner*—Steven O. Douglas
*Attorney, Agent, or Firm*—Birch, Stewart, Kolasch & Birch, LLP

[57] ABSTRACT

A filler pipe assembly for a fuel tank which comprises a filler pipe adapted to be connected to a fuel tank, the filler pipe containing an inlet aperture; a first plate hingedly mounted to the filler pipe and biased to close the filler pipe; a valve housing mounted to one side of the filler pipe; inflow and outflow pipes providing communication between the valve housing and a fuel tank, respectively; a second plate hingedly mounted to the outflow pipe to close the outflow pipe; and a valve disposed in the housing for opening and closing the second plate in response to the opening and closing of the first plate.

4 Claims, 1 Drawing Sheet

FUEL TANK FILLER PIPE ASSEMBLY FOR A VEHICLE

BACKGROUND OF THE INVENTION

1. Field of the Invention

The present invention relates to a filler pipe assembly for the fuel tank of a vehicle and more particularly, to a filler pipe assembly for a vehicle which prevents fuel vapor from being discharged into the atmosphere during a refueling operation and thus substantially eliminates fuel loss and atmospheric pollution.

2. Description of the Prior Art

Generally, a filler pipe for refueling is provided on one side of a vehicle, and a system for preventing the emission of fuel vapor into the atmosphere is associated with the filler pipe to contain the fuel vapor during a refueling operation.

A conventional filler pipe assembly for the fuel tank of a vehicle is hereinafter described in detail with reference to FIG. 1.

As shown in FIG. 1, a plate 2 is installed at the upper inside portion of a filler pipe 1, and the plate is hingedly mounted and is normally biased by a torsion spring (not shown) to a closed position. In a refueling operation, the plate 2 rotates downward to open the filler pipe 1. The plate automatically closes when the refueling operation is completed. In addition, a circulation pipe 3 is connected to both a fuel tank and to the filler pipe 1 on one side thereof beneath the plate 2.

However, in the conventional filler pipe assembly, only the plate 2 prevents the emission of fuel vapor into the atmosphere, so that some fuel vapor is discharged into the atmosphere during the refueling operation, thereby resulting in fuel loss and atmospheric pollution.

SUMMARY OF THE INVENTION

The present invention is therefore directed to solving the aforementioned problems and accordingly, it is an object of the present invention to provide a filler pipe assembly for an automobile which prevents fuel vapor from being discharged into the atmosphere during a refueling operation and thus prevents fuel loss and atmospheric pollution.

In a preferred embodiment of the present invention, a plate is hingedly mounted at an upper inside portion of a filler pipe and is biased by a torsion spring in a closed position. In a refueling operation, the plate rotates downward to open the filler pipe but then automatically closes the filler pipe when the refueling operation is completed, due to the bias of the hinge. A valve housing is provided on one side of the filer pipe where a conventional circulation pipe is normally installed, and an inflow pipe and an outflow pipe are provided at the lower end of the valve housing instead of a mere circulation pipe. A hinged plate is installed at the upper end portion of the outflow pipe and the hinged plate rotates upward and downward so as to open and close the outflow pipe. A lever arm is fixedly connected at one end thereof to one end portion of the hinged plate, and the upper portion of the lever arm is hingedly connected to the proximal end of an operating rod. The distal end of the operating rod slidably extends into the inside of the filler pipe. In addition, a folded, flexible corrugated sealing member having an elastic restoring force and surrounding a portion of the surface of the operating rod is located within the valve housing attached to the filler pipe.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION OF THE INVENTION

Preferred embodiments of the present invention will be hereinafter described in detail with reference to the accompanying drawings.

Figure 1:
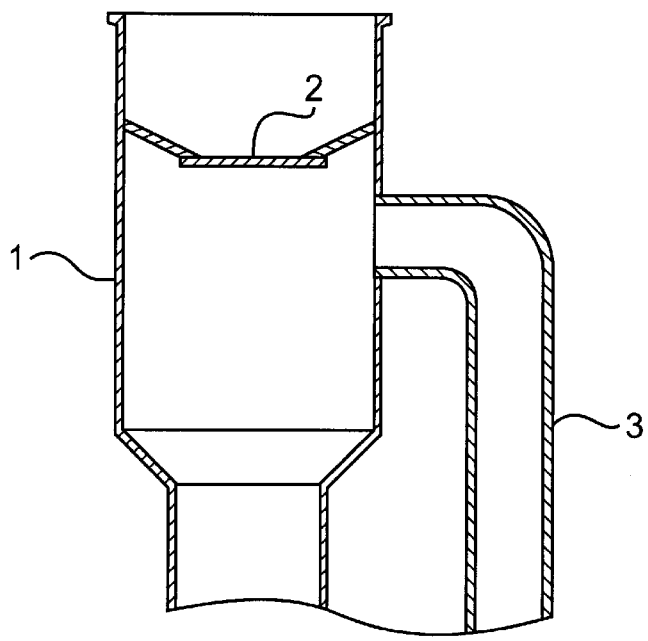
FIG. 1 is a detailed cross-sectional view of a conventional filler pipe assembly of a vehicle fuel tank.
Figure 2:
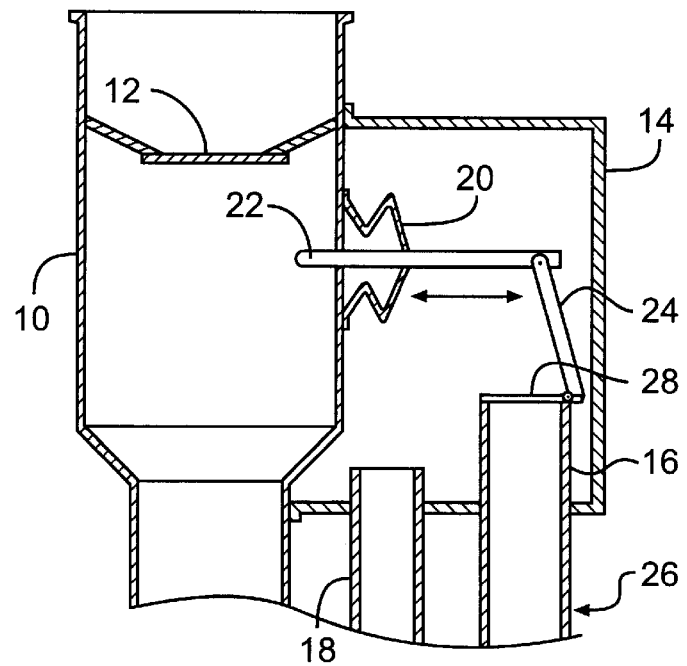
FIG. 2 is a detailed cross-sectional view of a filler pipe assembly of a vehicle fuel tank according to the present invention.

As shown in FIG. 2, a plate 12 is hingedly mounted at the upper inside of a filler pipe 10 and the plate is biased by a torsion spring in a closed position. In a refueling operation, the plate 12 rotates downward to an open position and automatically closes when refueling is completed.

In addition, a valve housing 14 is provided on one side of the filler pipe 10 where a conventional circulation pipe is normally installed, and circulation pipes 26 including an inflow pipe 18 and an outflow pipe 16 are provided at the lower end of the valve housing 14 instead of the conventional circulation pipe. A hinged plate 28 is installed at the upper end portion of the outflow pipe 16 which rotates upward to open the pipe and downward to close the outflow pipe 16. A lever arm 24 is connected at one end, to one end portion of the hinged plate 28, and is hingedly connected at its other end to the proximal end of an operating rod 22. The distal end of the operating rod is slidably inserted into the inside of the filler pipe 10. In addition, a folded, flexible corrugated member 20 having an elastic restoring force and surrounding a portion of the surface of the operating rod 22 is located within the valve housing 14 attached to the filler pipe 10.

According to the present invention, the insertion of a conventional fuel dispensing nozzle into the filler pipe will cause the plate 12 to rotate downward and open the filler pipe 10 during the refueling operation. The plate 12, rotated to the open position, engages with and moves the operating rod 22 extending into the filler pipe 10 in one direction which, in turn, moves the lever arm 24 hingedly connected to the proximal end of the operating rod 22 which opens the hinged plate 28 mounted on the upper end portion of the outflow pipe 16. Accordingly, the fuel vapor generated during the refueling operation is continuously circulated through the inflow pipe 18 within the valve housing 14, and consequently the fuel vapor is prevented from being discharged into the atmosphere.

Thus, according to the present invention, the emission of the fuel vapor is prevented from entering into the atmosphere during the refueling operation, thereby preventing fuel loss and at the same time, preventing atmospheric pollution.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A filler pipe assembly for a fuel tank which comprises:

a filler pipe adapted to be connected to a fuel tank, said filler pipe containing an inlet aperture;

first plate means hingedly mounted to said filler pipe and biased to close said filler pipe;

a valve housing mounted to one side of said filler pipe;

inflow and outflow means providing communication between the valve housing and a fuel tank, respectively;

second plate means hingedly mounted to said outflow means to close said outflow means; and connecting means disposed in said housing for opening and closing said second plate in response to the opening and closing of said first plate means.

2. The filler pipe of claim 1, wherein said connecting means comprises:

an operating rod having a first and second end, and slidably mounted in the wall of said filler pipe and extending from the filler pipe into said valve housing so that the first end is disposed in the filler pipe and the second end is disposed in said valve housing whereby when the first plate means is opened against its bias, it pushes the first end of the operating rod which causes the second end thereof to open the second plate means.

3. The filler pipe of claim 2 wherein a lever arm provides communication between the second end of the operating rod and the second plate means.

4. The filler pipe assembly of claim 2, wherein the location in the valve housing where the operating rod passes from the filler pipe to the valve housing is sealed by an elastic member which restores the operating rod to its initial position when the first plate means closes said filler pipe.

* * * * *